United States Patent [19]
Gouws et al.

[11] Patent Number: 5,375,947
[45] Date of Patent: Dec. 27, 1994

[54] METHOD OF FILLING A BOREHOLE

[75] Inventors: Johannes J. Gouws, Alberton; Lloyd M. Clark, Pretoria, both of South Africa

[73] Assignee: Multi Construction Chemicals (Proprietary) Limited, Transvaal, South Africa

[21] Appl. No.: 7,976

[22] Filed: Jan. 22, 1993

[30] Foreign Application Priority Data

Jan. 23, 1992 [ZA] South Africa .................. 92/0472
Mar. 4, 1992 [ZA] South Africa .................. 92/1612

[51] Int. Cl.⁵ ........................................... E21D 20/02
[52] U.S. Cl. ............................ 405/259.5; 405/269; 405/302.2
[58] Field of Search ............... 405/258, 259.5, 259.6, 405/269, 259.1, 288, 302.2

[56] References Cited

U.S. PATENT DOCUMENTS 4,154,486  5/1979  Nishikawa .
4,576,525  3/1986  Issakainen et al. .......... 405/259.6 X
4,735,509  4/1988  Rausch .

FOREIGN PATENT DOCUMENTS 4108871  4/1992  Japan .
2229653  10/1990  United Kingdom .
605920  4/1978  U.S.S.R. .

*Primary Examiner*—David H. Corbin
*Attorney, Agent, or Firm*—Burns, Doane, Swecker & Mathis

[57] ABSTRACT

A grout gun for filling a rockbolt borehole with measured doses of grout includes a grout breech for accommodating a predetermined quantity of grout, which is usually in the form of a grout capsule. An elongate rubular barrel extends from the grout breech. Catalyst dosing means, comprising a catalyst dosing chamber communicating with the grout breech and a catalyst inlet pipe, provide a measured dose of catalyst. A compressed air inlet communicates with the catalyst dosing chamber, and a manual trigger valve is provided for controlling the flow of compressed air through the inlet. The valve is operable to propel both the measured dose of the catalyst and the predetermined quantity of grout simultaneously through the barrel under influence of the propellant. An accumulator may be provided downstream of the compressed air inlet, for accommodating a predetermined quantity of compressed air each time the trigger valve is operated.

21 Claims, 4 Drawing Sheets

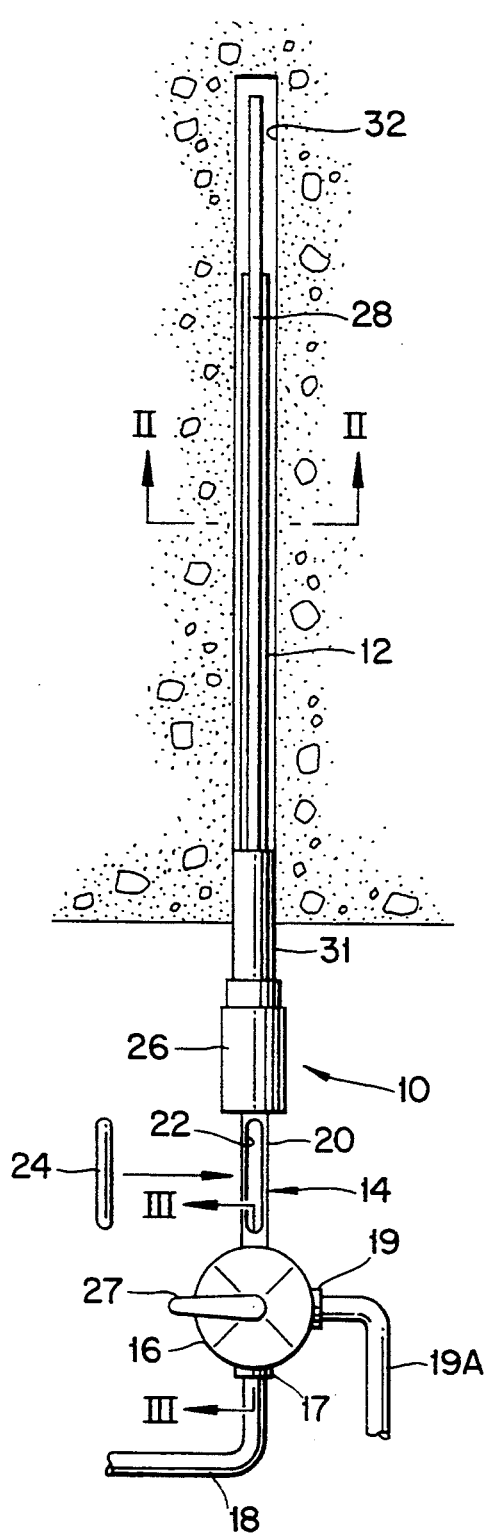

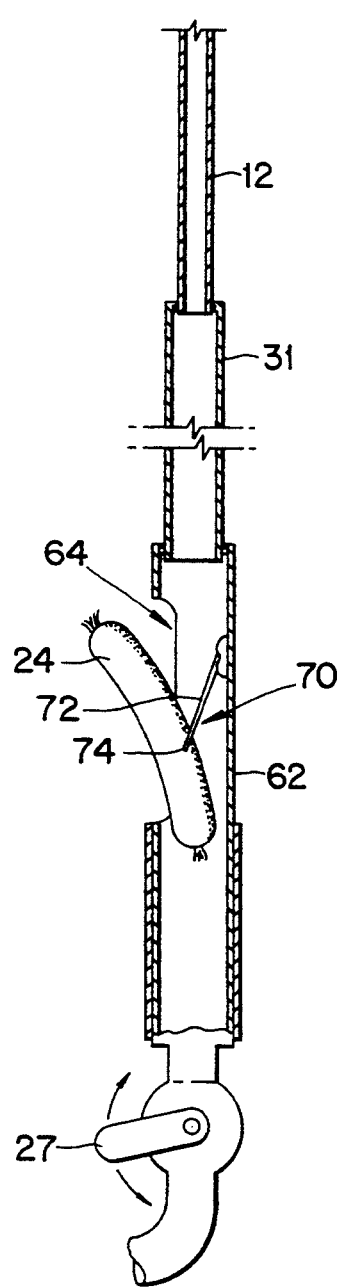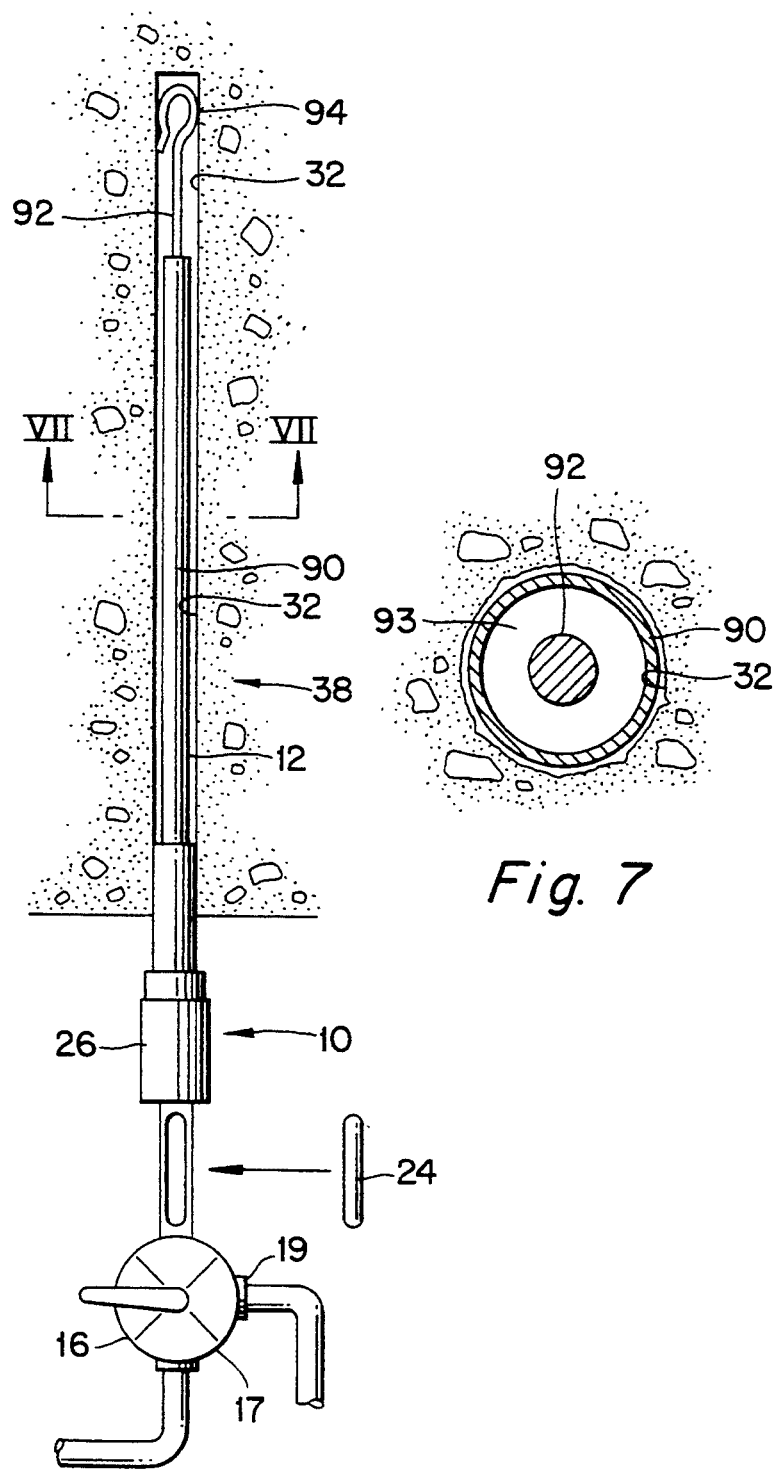

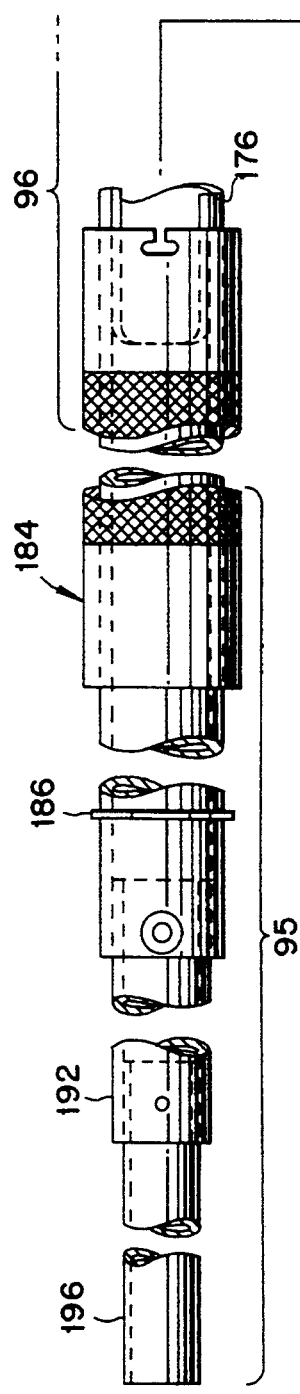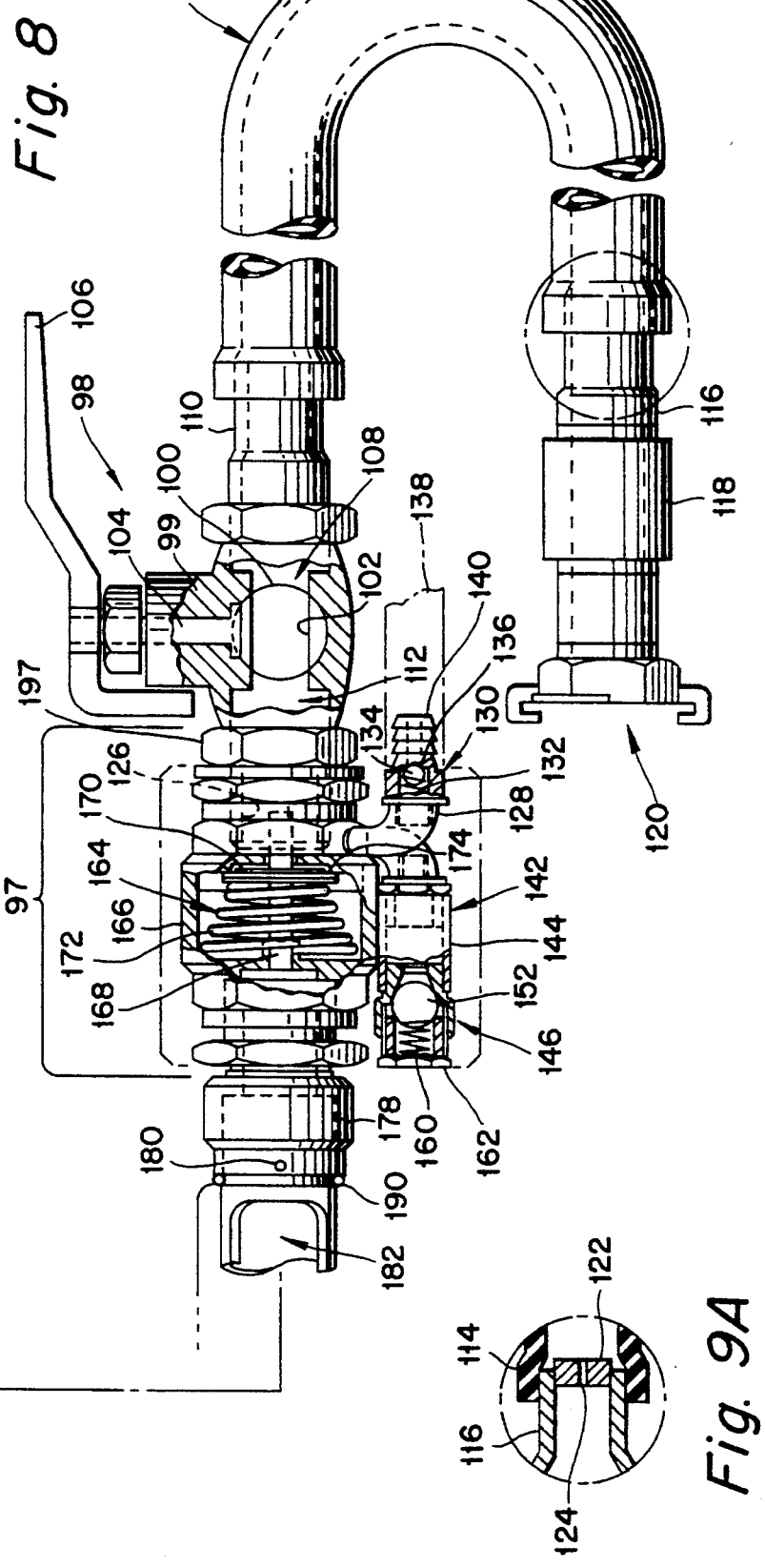

METHOD OF FILLING A BOREHOLE

BACKGROUND OF THE INVENTION

This invention relates to a method of filling a borehole with grout capsules, as well as to a grout capsule gun.

Conventional grout capsule guns are generally used to fire grout capsules into a borehole, so as to fill the borehole prior to or after the insertion of a support member, such as a rockbolt, into the hanging wall of a mine tunnel, for instance. While such grout capsule guns have been found to perform relatively well in respect of shorter boreholes, it has been found that those boreholes having a greater depth are not always completely and uniformly filled with grout capsules. Non-destructive testing of holes which have not been uniformly filled is impractical.

A further problem associated with grout capsules concerns the addition of a reactive catalyst to the capsule or cartridge. Generally the cartridges are supplied in a powdery form contained within a permeable sheath formed of a material such as paper. Where the catalyst is water, the usual system for bringing the powder into contact with the water catalyst is to immerse the capsules into ground water in the mine. Contaminants in the ground water may result in the material within the capsule not setting effectively.

This arrangement is also unsatisfactory in that as soon as the capsules are placed in the water, the chemicals in the capsule begin to react. Although capsules can be selected with different hardening times, the system is inherently difficult to control. Premature hardening will clearly be unsatisfactory since hardened capsules cannot be inserted into the borehole. Capsules which have a long hardening time are unsuitable since there is an attendant time delay before the rockbolt which is to be grouted into position by the capsule can carry a load.

In practice it is found that a high percentage of capsules are wasted as a result of difficulties in insertion thereof into the borehole after the capsules have been mixed with their catalyst. Capsules are also wasted as a consequence of absorbing too great a quantity of catalyst after being simply dropped into a bath of catalyst, such as water. Over-watering of the capsules upsets the cement to water ratio, thereby weakening the capsule once it has hardened.

SUMMARY OF THE INVENTION

According to a first aspect of the invention there is provided a grout gun for filling a borehole with measured doses of grout comprising:

(a) a grout breech for accommodating a predetermined quantity of grout;
(b) an elongate tubular barrel extending from the grout breech;
(c) catalyst dosing means for providing a measured dose of a catalyst, the catalyst dosing means communicating with the grout breech;
(d) a propellant inlet communicating with the catalyst dosing means; and
(e) a trigger valve for controlling the flow of propellant through the propellant inlet, the valve being operable to propel both the measured dose of the catalyst and the predetermined quantity of grout simultaneously through the barrel under influence of the propellant.

Preferably, an accumulator is provided downstream of the propellant inlet, the accumulator being arranged to accumulate a predetermined volume of propellant for ensuring that a uniform propelling force is provided each time the trigger valve is operated.

The predetermined quantity of grout is conveniently in the form of a grout capsule, the grout breech having an elongate opening formed therein for loading the grout capsule, a breech cover slidable between an open position, in which the opening is exposed, and a closed position, in which the opening is covered, and locking means for locking the breech cover in the closed position.

Advantageously, the elongate barrel includes a mixing chamber located adjacent the grout breech, the mixing chamber being of enlarged diameter relative to the remaining portion of the barrel, and being arranged to ensure pre-mixing of the catalyst and the grout.

A catalyst outlet valve is preferably provided between the catalyst dosing means and the grout breech, the catalyst outlet valve being arranged to open under influence of the propellant for allowing the propellant and the measured dose of catalyst to vent through the grout breech.

The catalyst dosing means typically comprises a catalyst dosing chamber, and a catalyst inlet pipe for supplying catalyst to the chamber, a non-return valve being located in the catalyst inlet pipe.

The catalyst dosing chamber may include an exhaust outlet having a purge valve and a bleed passage for venting excess propellant and catalyst from the catalyst chamber on completion of a firing cycle.

The catalyst dosing chamber may further include volume adjustment means for adjusting the volume of the chamber in accordance with the measured dose of catalyst required.

In one form of the invention, the elongate tubular barrel is arranged to accommodate an anchor located within the borehole.

The anchor may be arranged to extend axially through the barrel.

Alternatively, the barrel may have an elongate external recess defined therein and extending parallel to the central axis thereof within which the anchor is arranged to nest.

As an alternative to the measured doses of grout being housed in a sheath so as to form a grout capsule, the measured doses of grout may be fed into the breech in discreet uncapsulated doses. For this purpose, a grout container housing a sufficient quantity of grout may be coupled to the grout breech via a grout inlet pipe, and means, such as a grout pump, may be provided for introducing discreet quantities of grout into the grout breech.

The invention extends to a method of filling a borehole with grout comprising the steps of:

(a) providing a grout gun having an elongate tubular barrel;
(b) introducing a predetermined quantity of grout into a breech portion of the grout gun;
(c) introducing a measured dose of a catalyst into the grout gun;
(d) simultaneously firing both the catalyst and the grout through the barrel of the grout gun, by means of a propellant;
(e) repeating steps b) to d), preferably until the borehole is full.

According a still further aspect of the invention there is provided a method of filling a borehole with grout comprising the steps of:

(a) providing a grout gun having an elongate tubular barrel;
(b) loading a non-reacting grout capsule into a breech portion of the grout gun;
(c) introducing a measured dose of catalyst into the grout gun;
(d) simultaneously firing the catalyst and the grout capsule into the borehole by means of a propellant, the capsule and the catalyst reacting with one another as they are propelled up the barrel and introduced into the borehole; and
(e) repeating steps b) to d), preferably until the borehole is full.

Conveniently, the method includes the initial step of inserting an anchor into the borehole and subsequently introducing the barrel so that it overlaps the anchor.

The step of simultaneously firing the catalyst and the grout preferably includes the steps of opening and subsequently closing a manual trigger valve, the valve having an upstream end which is connected to a pressurised fluid line.

Typically, the method includes the further step of allowing pressurized fluid to accumulate in an accumulator prior to opening of the trigger valve, thereby to ensure that the quantity of pressurized fluid which is released into the grout gun is independent of the time for which the trigger valve is open.

BRIEF DESCRIPTION OF THE DRAWINGS

FIG. 1 shows a partly schematic side view of a first embodiment of a grout gun of the invention inserted into a borehole which accommodates a rockbolt;

FIG. 2 shows a cross-section on the line II—II of FIG. 1;

FIGS. 3A to 3C depict somewhat diagrammatic views along line III—III in FIG. 1C during different stages of a cartridge firing cycle according to the method of the invention;

FIG. 5 depicts an enlarged side sectional view of the breech section of the gun of FIG. 1 whilst a cartridge is being inserted therein;

FIG. 6 shows a partly schematic side view of a second embodiment of a grout gun of the invention;

FIG. 7 shows a cross-section on the line VII—VII of FIG. 6;

FIG. 8 shows a detailed partly cross-sectional view of a third embodiment of a grout gun of the invention; and FIGS. 9A, 9B and 9C show various details of parts of the grout gun of FIG. 8.

DESCRIPTION OF EMBODIMENTS

Figure 4:
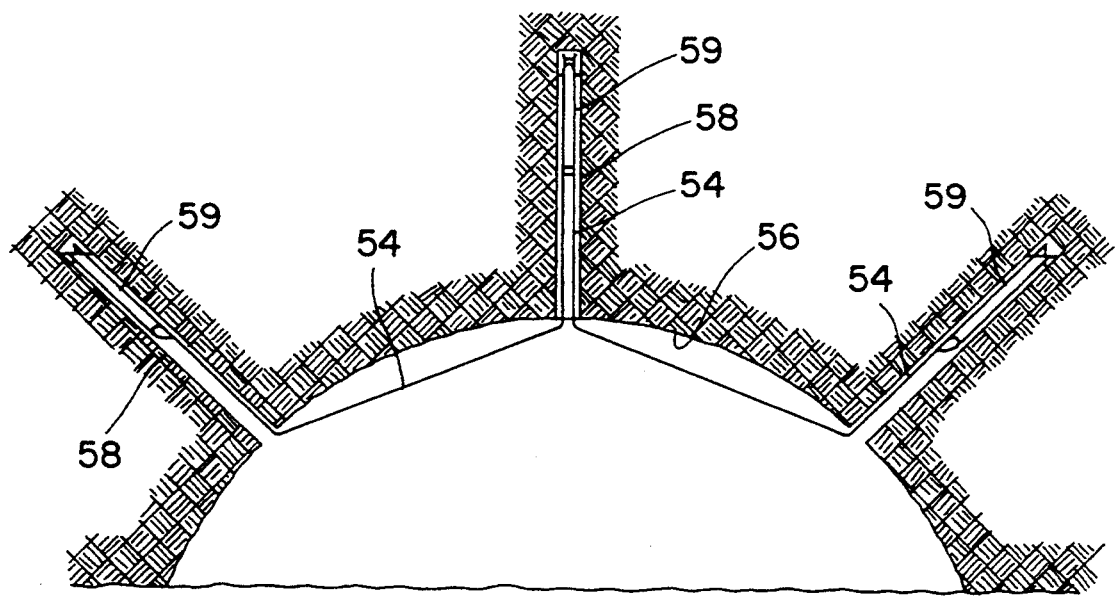
FIG. 4 depicts one type of hanging wall and support system with which the method and apparatus of the invention may be used.

The grout gun 10 illustrated in FIG. 1 comprises a barrel 12, a breech portion 14 connected to the barrel and a firing portion constituted by a manually operable two-way compressed air and water valve 16 which has an air inlet 17 connected to a compressed air line 18 and a water inlet 19 connected to a water line 19A. The breech portion 14 includes a tubular housing 20 having an elongate aperture 22 into which a grout capsule 24 can be loaded. A sleeve 26 is slid downwards over the aperture 22 once loading of the grout capsule 24 has taken place.

The valve 16 is in the form of a ball valve having a manually operable handle 27 which is moved briefly to the open position once the cartridge 24 has been loaded, in order to propel the cartridge through the barrel 12 under the influence of the compressed air, together with a measured dose of water, which acts as a catalyst.

Prior to insertion of the barrel 12 into a borehole 32, a rockbolt 28 is inserted into the borehole. In the particular embodiment, the rockbolt 28 is round-cylindrical in form, having a circular cross-section, as can be seen more clearly in FIG. 2. The barrel 12 is substantially C-shaped in cross-section, having a concave recess 30 within which the rockbolt 28 nests. The barrel 12 is formed from aluminum having a wall thickness of approximately 1.5 mm. The C-shaped profile of the barrel may be formed by forming an indent in a conventional round tubular barrel. Alternatively, the C-shaped barrel may be extruded from a C-shaped extrusion die. In the particular embodiment, the rockbolt 28 has a diameter of 12 mm, the barrel 12 has an inner diameter of 23 mm and an outer diameter of 25 mm, and the borehole 32 has a diameter of approximately 32 mm. An expanded mixing section 31 having an inner diameter of 25 mm and an outer diameter of 28 mm extends between the breech portion 14 and the barrel 12, and allows the cartridge 24 to build up speed before it reaches the more restricted barrel 12, as well as permitting premixing of the water with the capsule.

In use, the operation of the grout gun is as follows. As can be seen in FIG. 1, the rockbolt 28 is first inserted into the borehole 32, which has been drilled in the hanging wall 33 of a haulage in an underground mine. A suitable mechanical anchor may be used to anchor the rockbolt 28 temporarily in position. The C-shaped barrel of the grout gun 10 is then inserted into the borehole 32, with the end of the barrel extending just over halfway up the borehole. A so-called "flash setting" grout capsule or cartridge 24 having a diameter of 25 mm is then loaded into the breech portion 14 via the aperture 22, and the sleeve 26 is lowered so as to cover the aperture. The handle 27 is then briefly operated so as to cause the ball valve 16 to open. The consequent inrush of compressed air causes the cartridge 24 to be propelled up through the barrel together with the measured dose of catalyst. The cartridge may be in the form of a grout-filled cartridge or a chemical cartridge encased in a paper material.

Turning now to FIGS. 3A to 3C, the valve 16 is shown in more detail. The valve 16 includes a housing 42 and a ball-shaped valve closure member 44 which is rotatable by means of the external handle 27.

The valve 16 is adapted to admit a measured dose of catalyst into the gun and, in the arrangement shown, that catalyst is water. The water is supplied through the pipe 19A which connects into a port 48 through the wall of the housing and into an inner cavity 50 within the housing 42.

In the position of the valve shown in FIG. 3A, the valve is closed and air from the compressed air line 18 is prevented from passing through the valve.

In the position of the valve shown in FIG. 3B, the ball 44 has moved to an intermediate position. In this intermediate position a central chamber, or catalyst breech 52 extending diametrically through the ball is aligned with the port 48 and water from the pipe 19A is discharged into the chamber 52. It will be appreciated that the chamber 52 is of a predefined volume and that volume will be filled with a measured dose of water, as is indicated in FIG. 3B.

The volume of the chamber 52 will preferably be exactly equivalent to the quantity of catalyst needed to be mixed with the cartridge 24 to be fired by the gun. It is known that most commercially available cartridges require an amount of between 20 ml and 80 ml of water to be mixed therewith to satisfactorily cause the necessary chemical reactions to occur within the capsule material. The chamber 52 can be formed having the required volume so that an exactly correct volume of catalyst (i.e. water) will be mixed with each cartridge each time the gun is fired.

It is envisaged that, each time the gun is fired, the cartridge and catalyst will both be fired substantially simultaneously along the length of the barrel into position within the borehole. Mixing of the catalyst and the cartridge contents will commence on rupturing of the cartridge after the valve is activated, and will reach completion as the cartridge contents and the catalyst impact the end of the borehole. Clearly, the optimum amount of catalyst will be selected after trials to determine the effectiveness of the mixing.

In some applications it may be preferred that the quantity of catalyst can be varied, according to specific requirements which may change. In this event the dosing arrangement may include an adjustable measuring system which can be adjusted to vary the quantity of catalyst supplied in each firing of the gun. Clearly the catalyst need not be water and the system can operate with any suitable catalyst.

An advantage of providing a measured dose of catalyst is that the cartridge/catalyst mix can be made to be fast working so that the support assembly which the grout material is intended to fix into the borehole will be load supporting almost instantaneously.

FIG. 4 depicts an embodiment of a system developed by the applicant whereby a hanging wall is supported by a rope, cable or the like. The present invention will be particularly adapted for use with such a system since the gun will be insertable into the boreholes 58 alongside the cable 54 which supports the hanging wall 56 even before the grout is inserted into the borehole 58. During initial support the cable 54 is anchored in the boreholes 58 by mechanical anchors 59, and/or rigid support members. Thus, in this type of application the grout can be made to be extremely fast acting which consequently means that the hanging wall can be fully supported within minutes. This can be advantageous in fractured rock where delayed support can lead to rock falls or like problems.

As can be seen in FIG. 5, the grout gun 10 may be fitted with an appropriate sharp-edged leaf spring 72 which is arranged to cut the packaging of the cartridge 24 as it is inserted into the breech. On firing of the gun, the spring ensnares the packaging and retains it in the breech while the grout is fired into the borehole. Rupturing of the cartridge 24 and the removal of its covering also takes place, as it passes from the runway or mixing section 31, where it builds up speed and mixing commences, to the more constricted barrel 12. The free end 74 of the spring 72 is arranged to cut the packaging of the cartridge 66 as it is inserted into the breech. The free end 74 of the spring is directed downwardly so that, on firing the gun, the spring will ensnare the packaging and retain it in the breech whilst the grout is fired into the borehole. Thus, the borehole will not be contaminated by the packaging which serves no purpose and can, in fact, decrease the support provided by the grout due to contact between the support member and the packaging.

During each cycle, prior to the new cartridge being inserted into the breech, the packaging from the previous firing will be removed from the spring and discarded.

In an alternative embodiment of the invention, which is illustrated in FIGS. 6 and 7, a round tubular barrel 90 is used. A rockbolt 92 having a shepherd's crook end 94 is inserted fully into the borehole 32 with the shepherd's crook 94 serving to anchor the rockbolt 92 temporarily within the borehole 32. The barrel 90, which may be separated from the grout gun 10, is then inserted in to the borehole with the rockbolt 92 extending through the barrel, as is shown in FIG. 5. The rockbolt terminates just after the entrance to the borehole 32, and therefore does not interfere with the grout gun.

In one form of the invention, a plastic pipe barrel may be used. This can be pushed up a skew borehole and can be fed around the rockbolts when fast setting capsules are used with a rockbolt already in place.

A cartridge 24 is loaded into the grout gun 10, and is fired off in the manner described earlier on in the specification. The mixture of grout and water travels through the annular chamber 94 defined between the rockbolt 92 and the barrel 90, and consolidates against the end of the borehole 32 so as to cement the rockbolt into position. After firing of the cartridge has occurred, the grout which has accumulated on the inner walls of the barrel 90 is washed off by briefly opening the ball valve 16 once more. The barrel 90 is then progressively retracted and the borehole 32 is filled up with grout using the above-mentioned loading, firing and rinsing procedures.

Pre-insertion of the rockbolt facilitates the use of "flash setting" grouts having an extremely quick setting time. In larger boreholes having a diameter of more than 35 mm, it is usually possible to insert the rockbolt alongside a round tubular barrel. In boreholes having a diameter of 32 mm or less, pre-insertion of the rockbolt is only possible if it is inserted up through the centre of the barrel, or alternatively if a barrel having an indent 78 such as that illustrated in FIG. 2 is used.

Referring now to FIG. 8, a detailed view of a preferred embodiment of a grout gun 94 is shown. The grout gun 94 has a front barrel section 95, a grout breech 96, an intermediate catalyst dosing section 97, a rear trigger valve 98 and an accumulator 99.

The trigger valve 98 comprises a ball valve housing 99 housing a ball valve 100 through which a cylindrical passageway 102 passes. The ball valve 100 is carried on a shaft 104 which is in turn connected to a valve handle 106. The valve housing 99 defines an inlet port 108 which is coupled to a reducing nipple 110, as well as an outlet port 112 which communicates with the catalyst dosing section 97. It is clear that operation of the valve handle 106 will cause the passageway 102 to move selectively into or out of alignment with the inlet and outlet ports 108 and 112.

Figures 9B, 9C:
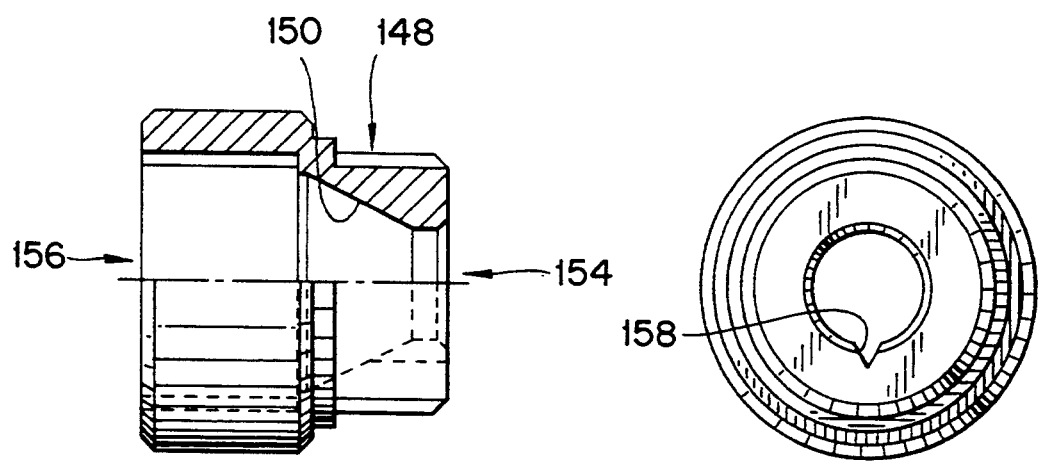

The accumulator 99 incorporates a 5 m flexible hose 114, which is press-fitted to the nipple 110. The rear end of the flexible hose is in turn fitted to a further reducing nipple 116, which is connected by a sleeve 118 to a bayonet-type coupling 120. As can be seen in the FIG. 9A detail, an orifice plate 122 having an axial 3 mm orifice 124 is force fitted into the front end of the reducing nipple 116. The bayonet coupling 120 is designed to be fitted to a corresponding coupling at the end of a compressed air line. The flexible hose 114, the reducing nipples 110 and 116 and the orifice plate 122 together make up the accumulator 99 for ensuring that the correct dose of compressed air is supplied to the grout gun 96 once the ball valve 100 has been opened.

The outlet port 112 broadens into a catalyst chamber, which is defined in broken outline at 126. A water inlet pipe 128 communicates with the chamber 126 and is fitted with a non-return spring-operated ball valve 130, in which a coil spring 132 biases a steel ball 134 against a valve seat 136. A high pressure water hose 138 is coupled to a hose adaptor 140 at the free end of the inlet pipe 128.

An exhaust pipe 142 also vents from the catalyst chamber 126. The exhaust pipe 142 has a coupling sleeve 144 which is in turn coupled to a non-return purge valve 146. As can be seen in more detail in FIG. 9B and 9C, the non-return valve includes a non-return bush 148 having a valve seat 150 for seating a steel ball 152 between an inlet port 154 and an outlet port 156. A bleed groove or passage 158 is machined through the inlet port 154 and the seat 150, and is arranged to allow excess water and pressurised air from the catalyst chamber 126 to bleed through the non-return valve even when the ball 152 is seated against the valve seat 150 under influence of the coil spring 160. The coil spring 160 is housed within a reducing bush 162, which is screwed into the free outlet port 156 of the non-return bush 148.

Located directly downstream of the catalyst chamber 126 is a disc valve arrangement 164. A valve housing 166 contains an axially extending shaft 168 along which a valve disc 170 is arranged to slide. A frusto-conical coil spring 172 is seated at the downstream end of the valve housing 166 and biases the valve 170 against an annular valve seat 174. The conical shape of the spring 172 places less strain on a compressed spring, in that it allows the compressed spring to adopt a spiral shape, in which successive turns nest within one another.

A grout capsule breech 176 is located downstream of the valve housing 166, and is coupled to the remaining portion of the grout gun by means of a connector 178 carrying a coupling pin 180. The capsule breech 176 has an elongate capsule opening 182 formed therein for loading grout capsules. A tubular breech cover 184 is arranged to slide between an open position, in which it abuts a circlip 186, and allows a grout capsule to be fed into the opening 182, and a closed position, in which it covers the opening 182. The bridge cover 184 can be locked in a closed position by means of three equispaced female bayonet fittings, one of which is shown as 188, within which the transverse pin 180 locates. An O-ring 190 provides an effective seal when the breech cover 184 is in a closed position.

A distance piece or runway section 192, which is formed from a 1 meter length of aluminium tubing having an inner diameter of 25.6 mm, is connected to the end of the capsule breech 176 by means of a pair of cap screws 194. As was described earlier in the specification, the runway section is provided to ensure that the pre-mixing of the capsule and the catalyst takes place. An end nozzle 196, having a length of just over 1 m, is in turn mounted to the end of the runway section 192. The end nozzle 196 has a slightly reduced internal diameter of 23 mm relative to the runway section. The end nozzle 196, the runway section 192 and the front portion of the capsule breech 176 in combination form the barrel section 95 of the grout gun.

The grout gun 96, while being operated in the same basic manner as the previously described grout guns, has a number of additional features. The accumulator ensures that the correct quantity of compressed air is fed into the remaining portion of the grout gun every time the ball valve 100 is opened. Consequently, even if the valve handle 106 is opened for an extended period by an unskilled operator, only that compressed air which is in the accumulator is vented through the valve. On closure of the valve, the accumulator is replenished with compressed air travelling through the orifice 124 in the orifice plate 122.

The catalyst chamber 126 is sized to ensure that it receives the correct quantity of water, which is typically 45 ml, through the inlet pipe 128. The non-return valve 130 is provided to ensure that water does not leak back through the water inlet pipe 128. The catalyst chamber 126 is fitted with a replaceable washer 197. The volume of the chamber 126 may be varied by removing the washer 197 and replacing it with one that is of a different thickness. In this way, the correct dosages of catalyst may be provided to react with capsules of different sizes, or with varying hydrophillic properties.

Once the catalyst chamber 126 has been filled with water, the ball valve 100 is opened, thereby causing the compressed air which has accumulated in the accumulator 97 to rush into the catalyst chamber 126 so as to increase the pressure in the catalyst chamber 126, thereby displacing the valve disc 170 away from the valve seat 124 and causing a mixture of water and compressed air to rush through the valve housing 166 and into the capsule breech 176. Prior to opening of the ball valve 100, a grout capsule is loaded into the capsule breech, and the breech cover 184 is locked in the closed position. The inrush of compressed air and water drives the capsule up the barrel, with the water simultaneously reacting with the capsule contents in the runway section 192, as has been described previously. Once the compressed air and water has been vented from the catalyst chamber 126, the valve disc 170 returns to the closed position under influence of the spring 172. Any excess air or water in the catalyst chamber bleeds out through the exhaust pipe 142 via the bleed groove 158, thereby releasing the pressure in the catalyst chamber 126. The non-return purge valve 146 is provided to prevent an excess of pressure build up in the catalyst chamber 126. After a grout capsule is fired, the aforementioned barrel rinsing procedure may take place before firing of the next capsule. This is achieved merely by opening the ball valve 100 once sufficient water has accumulated in the catalyst chamber 126.

Current mining legislation requires that a cementitious grout must have a load bearing capacity of ten tons after a time period of four hours. The use of chemical grout capsules may reduce this time period to half an hour. By employing the method of the invention, it is possible to use "flash setting" grouts having a setting time of fifteen minutes or less, the setting time being the time it takes for the grout to set so as to be able withstand a load of at least ten tons. With reduced setting times, the entire mining operation may be speeded up considerably.

We claim:
1. A grout gun for filing a borehole with measured doses of grout comprising:

a) a grout breech for accommodating a predetermined quantity of powdered grout;

b) an elongate tubular barrel extending from the grout breech;

c) catalyst dosing means including a catalyst inlet connectible to a source of liquid catalyst for providing a measured dose of a liquid catalyst for activating the powdered grout, the catalyst dosing means being communicable with the grout breech;

d) a propellant inlet separate from the catalyst inlet and connectible to a source of a propellant fluid different from the liquid catalyst, the propellant inlet being communicable with the catalyst dosing means, and e) a trigger valve for controlling the flow of propellant fluid through the propellant inlet, the valve being operable to communicate both the measured dose of the catalyst and the propellant fluid with the predetermined quantity of powdered grout simultaneously, so that the predetermined quantity of powdered grout and the measured dose of catalyst are propelled simultaneously through the barrel under influence of the propellant.

2. A grout gun according to claim 1 in which an accumulator is provided downstream of the propellant inlet, the accumulator being arranged to accumulate a predetermined volume of propellant for ensuring that a uniform propelling force is provided each time the trigger valve is operated.

3. A grout gun according to claim 1 in which the predetermined quantity of powdered grout is in the form of a one-part grout capsule, the grout breech having an elongate opening formed therein for loading the grout capsule, a breech cover slidable between an open position, in which the opening is exposed, and a closed position, in which the opening is covered, and locking means for locking the breech cover in the closed position.

4. A grout gun according to claim 1 in which the elongate barrel includes a mixing chamber located adjacent the grout breech, the mixing chamber being of enlarged diameter relative to the remaining portion of the barrel, and being arranged to ensure pre-mixing of the catalyst and the grout.

5. A grout gun according to claim 1 in which a catalyst outlet valve is provided between the catalyst dosing means and the grout breech, the catalyst outlet valve being arranged to open under influence of the propellant for allowing the propellant and the measured dose of catalyst to vent through the grout breech.

6. A grout gun according to claim 1 in which the catalyst dosing means comprises a catalyst dosing chamber, a catalyst inlet pipe defining the catalyst inlet for supplying catalyst to the chamber, and a non-return valve being located in the catalyst inlet pipe.

7. A grout gun according to claim 6 in which the catalyst dosing chamber includes an exhaust outlet having a purge valve and a bleed passage for venting excess propellant and catalyst from the catalyst chamber on completion of a firing cycle.

8. A grout gun according to claim 1 in which the catalyst dosing chamber includes volume adjustment means for adjusting the volume of the chamber in accordance with the measured dose of catalyst required.

9. A grout gun according to claim 1 in which the elongate tubular barrel is arranged to accommodate an anchor located within the borehole.

10. A grout gun according to claim 9 in which the anchor is arranged to extend axially through the barrel.

11. A grout gun according to claim 9 in which the barrel has an elongate external recess defined therein and extending parallel to the central axis thereof within which the anchor is arranged to nest.

12. A grout gun according to claim 1 in which the catalyst is water and the propellant is compressed air.

13. A method of filling a borehole with grout comprising the steps of:

a) providing a grout gun having an elongate tubular barrel;

b) introducing a predetermined quantity of powdered grout into a breech portion of the grout gun;

c) introducing a measured dose of a liquid catalyst for activating the powdered grout into a catalyst inlet in the grout gun, the dose of catalyst being dependent on the quantity of grout;

d) simultaneously firing both liquid catalyst and the powdered grout through the barrel of the grout gun by means of a propellant which is different from the catalyst, whereby the liquid catalyst and the powdered grout react with one another as they are propelled into the borehole; and e) repeating steps b) to e) until the borehole is full.

14. A method of filling a borehole with grout comprising the steps of:

a) providing a grout gun having an elongate tubular barrel;

b) loading a self-reacting one-part grout capsule into a breech portion of the grout gun;

c) introducing a measured dose of liquid catalyst into the grout gun, the measured dose being sufficient to react with the grout capsule;

d) simultaneously firing the catalyst and the grout capsule into the borehole by means of a propellant which is different from the catalyst, whereby the grout capsule and the liquid catalyst commence reacting with one another as they are propelled into the borehole; and e) repeating steps b) to e) until the borehole is full.

15. A method according to claim 13 which includes the initial step of inserting an anchor into the borehole and subsequently introducing the barrel so that it overlaps the anchor.

16. A method according to claim 13 in which the step of simultaneously firing the catalyst and the grout includes the steps of opening and subsequently closing a manual trigger valve, the valve having an upstream end which is connected to a propellant inlet.

17. A method according to claim 16 which includes the step of allowing propellant to accumulate in an accumulator prior to opening of the trigger valve, thereby to ensure that the quantity of propellant which is released into the grout gun is independent of the time for which the trigger valve is open.

18. A grout gun according to claim 1 including a housing communicating with the breech, the catalyst dosing means comprising an aperture in the housing, the aperture being of a volume defining the volume of the dose of liquid catalyst.

19. A grout gun according to claim 18, wherein the aperture is formed in the trigger valve, the trigger valve being disposed in the housing for movement to a first position communicating the aperture with the catalyst inlet for receiving the liquid catalyst, and a second position communicating the aperture with both the propellant inlet and the grout breech.

20. A method according to claim 13, wherein the step of simultaneously firing includes directing a gaseous propellant against the liquid catalyst and the grout.

21. A method according to claim 14, wherein the step of simultaneously firing includes directing a gaseous propellant against the catalyst and grout.

* * * * *